US012680978B2

(12) United States Patent
Sakakibara et al.

(10) Patent No.: US 12,680,978 B2
(45) Date of Patent: Jul. 14, 2026

(54) SENSOR ELEMENT, GAS SENSOR, AND PRODUCTION METHOD FOR SENSOR ELEMENT

(71) Applicant: Niterra Co., Ltd., Nagoya (JP)

(72) Inventors: Toshimasa Sakakibara, Nagoya (JP); Tatsuhiko Muraoka, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 421 days.

(21) Appl. No.: 18/299,176

(22) Filed: Apr. 12, 2023

(65) Prior Publication Data

US 2023/0333048 A1     Oct. 19, 2023

(30) Foreign Application Priority Data

Apr. 14, 2022     (JP) ................................. 2022-066816
Nov. 30, 2022     (JP) ................................. 2022-191136

(51) Int. Cl.
G01N 27/407          (2006.01)

(52) U.S. Cl.
CPC ..... G01N 27/4072 (2013.01); G01N 27/4073 (2013.01); G01N 27/4077 (2013.01)

(58) Field of Classification Search
CPC .......... G01N 27/4072; G01N 27/4073; G01N 27/4077; G01N 27/409–41
See application file for complete search history.

(56) References Cited

U.S. PATENT DOCUMENTS

| | | | |
|---|---|---|---|
| 2013/0104625 A1 | 5/2013 | Otsuka et al. | |
| 2017/0284958 A1* | 10/2017 | Watanabe | .......... G01N 27/4074 |
| 2020/0209185 A1* | 7/2020 | Watanabe | .......... G01N 27/4077 |

FOREIGN PATENT DOCUMENTS

JP          2013-096792 A     5/2013

* cited by examiner

*Primary Examiner* — James Lin
*Assistant Examiner* — Vivian A Tran
(74) *Attorney, Agent, or Firm* — Sughrue Mion, PLLC

(57)          ABSTRACT

A sensor element (100) including: a detection element portion (300) provided with at least one cell (130, 140) having a solid electrolyte (105, 109) and a pair of electrodes (104, 106, 108, 110) disposed on the solid electrolyte; a measurement chamber (107*c*) faced by one of the electrodes; and a diffusion resistance portion (115) through which a gas to be measured is introduced from outside into the measurement chamber. A porous protection layer (21) is in direct contact with the diffusion resistance portion and covers the diffusion resistance portion. The porous protection layer contains ceramic particles which serve as a backbone, and has pores formed in gaps between the ceramic particles. A diameter ratio R represented by (an average diameter D1 (nm) of the pores/a particle diameter D2 (nm) at which an accumulated number of the ceramic particles accounts for 50%) is not greater than 100.

12 Claims, 6 Drawing Sheets

SENSOR ELEMENT, GAS SENSOR, AND PRODUCTION METHOD FOR SENSOR ELEMENT

BACKGROUND OF THE INVENTION

1. Field of the Invention

The present invention relates to a sensor element and a gas sensor that are suitably used for detecting the concentration of a specific gas contained in combustion gas or exhaust gas from, for example, a combustor, an internal combustion engine, or the like, and a production method for producing the sensor element.

2. Description of the Related Art

To date, a gas sensor for detecting the concentration of a specific component (e.g., oxygen) in exhaust gas from an internal combustion engine has been employed. This gas sensor has a sensor element therein and the sensor element has a detection element portion including a solid electrolyte and a pair of electrodes. The sensor element may be exposed to a poisonous substance such as silicon or phosphorus contained in the exhaust gas, or water droplets in the exhaust gas may become attached thereto. Therefore, the outer surface of the sensor element is covered by a porous protection layer so as to capture the poisonous substance or prevent water droplets from coming into direct contact with the sensor element. That is, the entire periphery of a front end portion, of the above stacked body, that is exposed to a gas to be measured (exhaust gas) is covered by the porous protection layer (see Patent Document 1).

Inside the sensor element, a measurement chamber faced by one electrode of the above pair of electrodes is formed, and the gas to be measured is introduced from outside the sensor element into the measurement chamber. A diffusion resistance portion is present between the measurement chamber and the outside, and adjusts the rate of diffusion of the gas to be measured that is introduced into the measurement chamber. Thus, the porous protection layer is in direct contact with the diffusion resistance portion.

Patent Document 1: Japanese Patent Application Laid-Open (kokai) No. 2013-096792

3. Problems to be Solved by the Invention

As shown in FIG. 8, the porous protection layer is produced as follows: a coating liquid 400x in which ceramic particles 2 and a pore-forming material 410 such as a burn-out-type carbon are mixed is applied to the outer surface near a diffusion resistance portion 115 of the sensor element, and then is dried and sintered. The pore-forming material 410 burns out during the sintering to generate pores, whereas the ceramic particles 2 are bound together to serve as a backbone having a network structure of the porous protection layer.

When the coating liquid 400x is applied, water is absorbed by the liquid-permeable diffusion resistance portion 115, and the ceramic particles 2 and the pore-forming material 410 in the coating liquid 400x also tend to aggregate toward the diffusion resistance portion 115 as shown by the arrows in FIG. 8.

However, when the average particle diameter of the pore-forming material 410 is too large relative to the average particle diameter of the ceramic particles 2, a large number of the ceramic particles 2 having a small diameter aggregate in a large gap G1 formed around the pore-forming material 410 having a large diameter. Meanwhile, in another small gap G2, the ceramic particles 2 do not aggregate much, and as a result, the thickness of the backbone formed after sintering and the distribution of pores in the backbone are not uniform. Associated therewith, the flow of exhaust gas that enters the measurement chamber through the porous protection layer varies locally, which may cause a decrease in detection accuracy.

SUMMARY OF THE INVENTION

Therefore, an object of the present invention is to provide a sensor element and a gas sensor in which a decrease in detection accuracy due to the porous protection layer is suppressed, and a production method for producing the sensor element.

The above object has been achieved in a first aspect of the invention by providing (1) a sensor element comprising: a detection element portion provided with at least one cell having a solid electrolyte and a pair of electrodes disposed on the solid electrolyte; a measurement chamber faced by one of the pair of electrodes; and a diffusion resistance portion through which a gas to be measured is introduced from outside the sensor element into the measurement chamber, wherein the sensor element further comprises a porous protection layer that is in direct contact with the diffusion resistance portion and which at least covers the diffusion resistance portion, the porous protection layer contains ceramic particles which serve as a backbone, and has pores formed in gaps between the ceramic particles, and a diameter ratio R represented by (an average diameter D1 (nm) of the pores/a particle diameter D2 (nm) at which an accumulated number of the ceramic particles accounts for 50%) is not greater than 100.

According to the above sensor element (1), since the diameter ratio R is not greater than 100, the average diameter (corresponding to D1) of a pore-forming material which is contained in a coating liquid forming the porous protection layer and which is removed to generate pores does not become too large relative to the particle diameter D2 of the ceramic particles, and the sizes of a plurality of gaps formed around the adjacent pore-forming material become uniform. Then, the ceramic particles evenly aggregate (are dispersed) in each gap, and the size of a space (each gap) in which the ceramic particles can be present is restricted, whereby the aggregate of the ceramic particles is less likely to become large.

As a result, the thickness of the backbone formed after sintering the coating liquid and the distribution of pores in the backbone also become uniform. Accordingly, the flow of the gas to be measured that enters into the measurement chamber through the porous protection layer does not vary locally, and thus a decrease in detection accuracy can be suppressed.

D2 is the particle diameter (D50 which is the median diameter) of particles corresponding to 50% when particles are counted from the small particle diameter side up to 50%.

In a preferred embodiment (2) of the above sensor element, the average diameter D1 of the pores is not greater than 15 μm, and/or the particle diameter D2 is not less than 150 nm.

When the particle diameter D1 is greater than 15 μm, pores of the obtained porous protection layer become too large, and it may become difficult to sufficiently prevent water and poisonous substances from entering from outside the sensor element. Also, when the particle diameter D2 is less than 150 nm, the particle diameter is too small, and thus, handling of the particles as a powder and preparation of a coating liquid may become difficult.

According to the above sensor element (2), such problems can be prevented.

In another preferred embodiment (3) of the above sensor element (1), a maximum diameter M1 ($\mu$m) of the pores is less than twice the average diameter D1 ($\mu$m) of the pores.

According to the sensor element (3), as the particle size distribution of the pore-forming material is narrowed, the sizes of the above described gaps become further even, and thus, the distribution of pores also becomes further uniform.

In a second aspect, the present invention provides (4) a gas sensor comprising: the sensor element of any of (1) to (3) above configured to detect a concentration of a specific gas component in a gas to be measured; and a housing holding the sensor element.

In a third aspect, the present invention provides (5) a production method for producing a sensor element, the sensor element including a detection element portion provided with at least one cell having a solid electrolyte and a pair of electrodes disposed on the solid electrolyte, a measurement chamber faced by one of the pair of electrodes, and a diffusion resistance portion through which a gas to be measured is introduced from outside the sensor element into the measurement chamber, the production method comprising: a coating liquid preparation step of preparing a coating liquid in which ceramic particles and a pore-forming material are mixed; an application step of applying the coating liquid so as to be in direct contact with the diffusion resistance portion and so as to cover the detection element portion, at an outer surface of the sensor element; and a porous protection layer formation step which comprises drying and sintering the applied coating liquid and removing the pore-forming material to form a porous protection layer that contains the ceramic particles which serve as a backbone and has pores formed at removed parts of the pore-forming material, wherein in the coating liquid, a diameter ratio R represented by (an average diameter D3 (nm) of the pore-forming material/a particle diameter D2 (nm) at which an accumulated number of the ceramic particles accounts for 50%) is not greater than 100.

In a preferred embodiment (6) of the production method (5), said removing comprises burning out the pore-forming material by drying and sintering the applied coating liquid, and said removed parts are burnt-out parts of the pore-forming material.

In another preferred embodiment (7) of the production method (5), said removing comprises dissolving the pore-forming material, and said removed parts are dissolved parts of the pore-forming material.

Advantageous Effects of the Invention

The present invention provides a sensor element which suppresses a decrease in detection accuracy due to use of a porous protection layer.

DESCRIPTION OF REFERENCE NUMERALS

Figure 1:
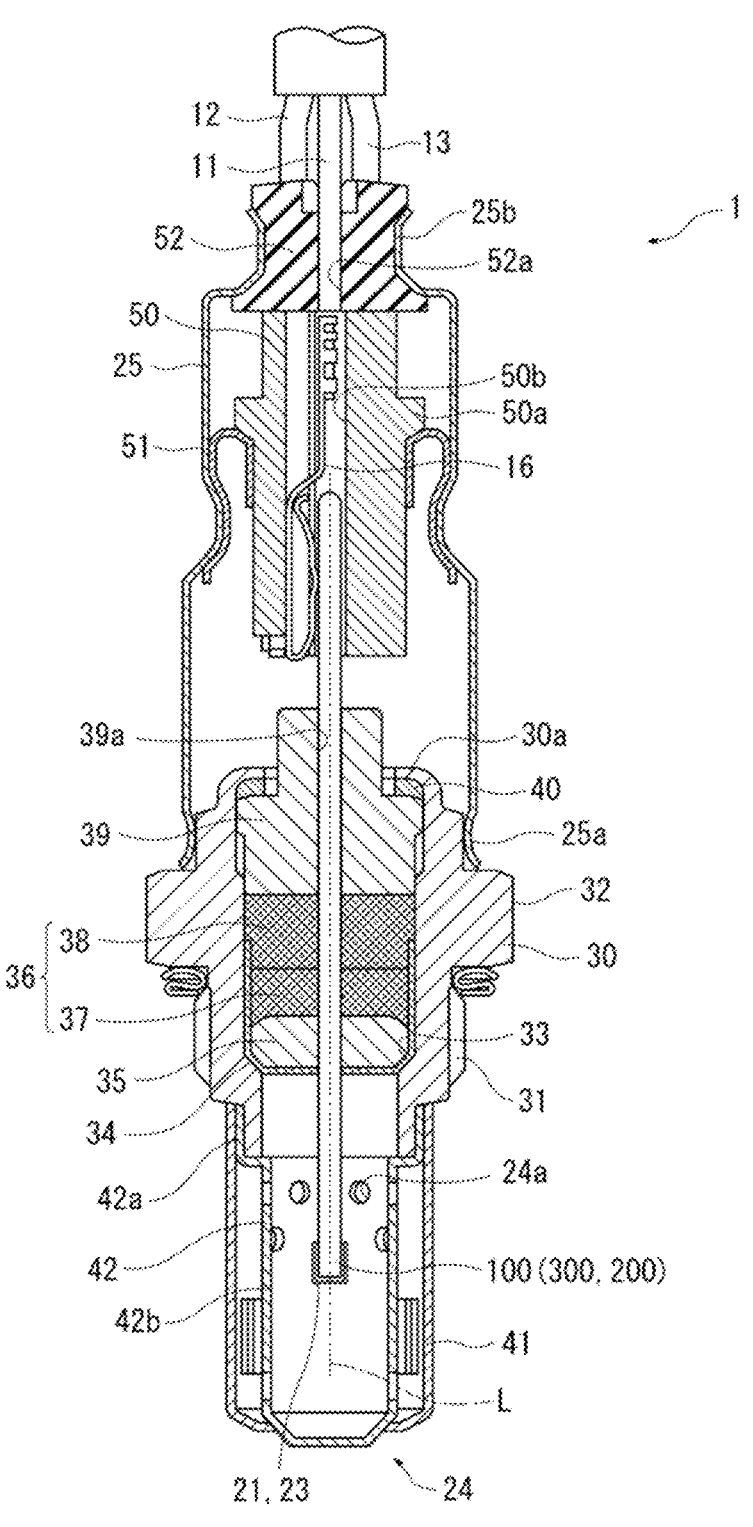
FIG. 1 is a sectional view along the longitudinal direction of a gas sensor (oxygen sensor) according to an embodiment of the present invention.

Reference numerals used to identify various features in the drawings include the following.

1 gas sensor
2 ceramic particle
21 porous protection layer
30 housing
104,106,108,110 pair of electrodes
106,108 one electrode
107c measurement chamber
105,109 solid electrolyte
100 sensor element
115 diffusion resistance portion
130,140 cell
250 pore-forming material
300 detection element portion
L axial-line

DETAILED DESCRIPTION OF THE PREFERRED EMBODIMENTS

Hereinafter, an embodiment of the present invention will be described in further detail with reference to the drawings. However, the present invention should not be construed as being limited thereto.

Figure 2:
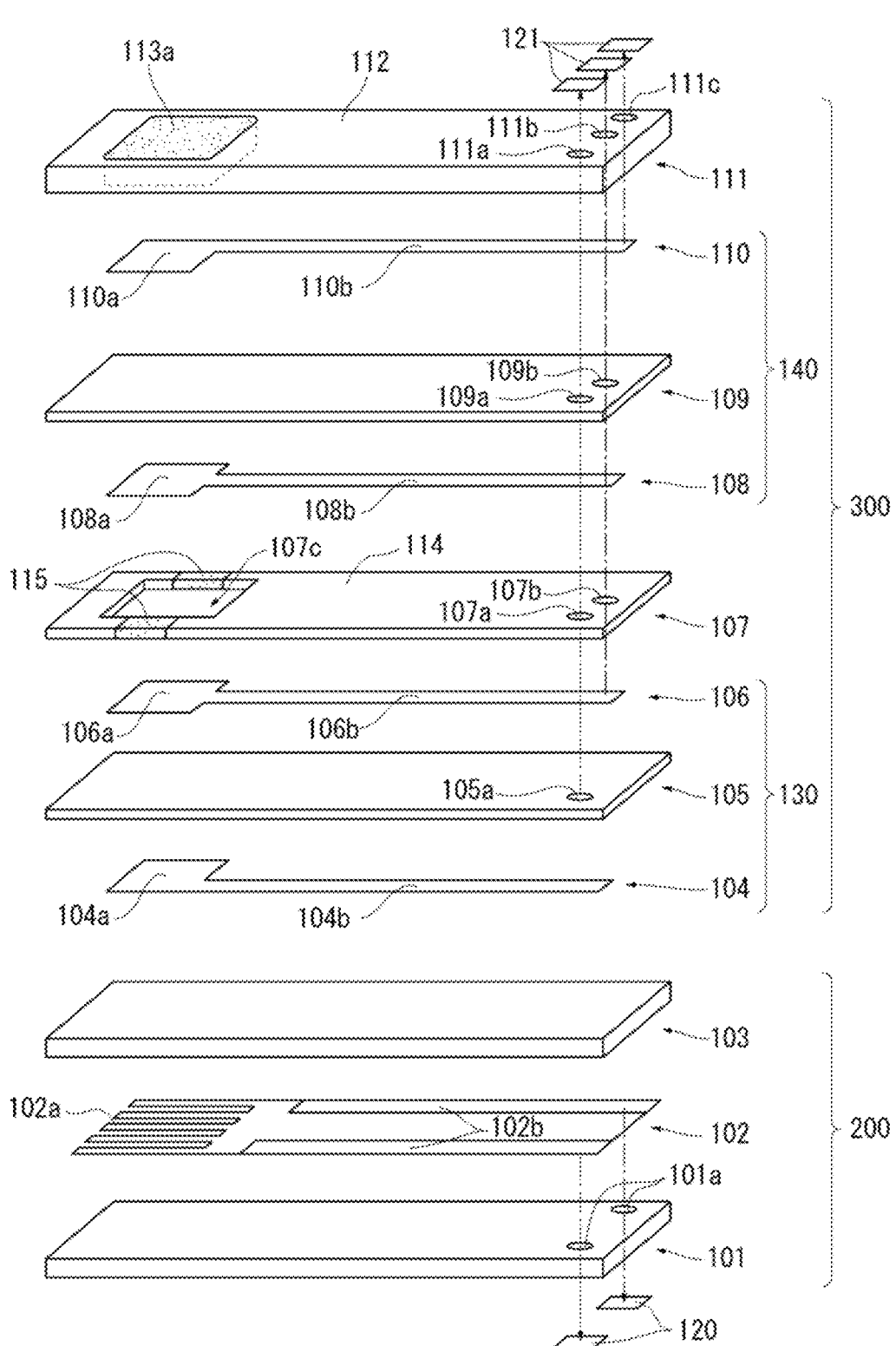
FIG. 2 is a schematic exploded perspective view of a detection element and a heater.
Figure 3:
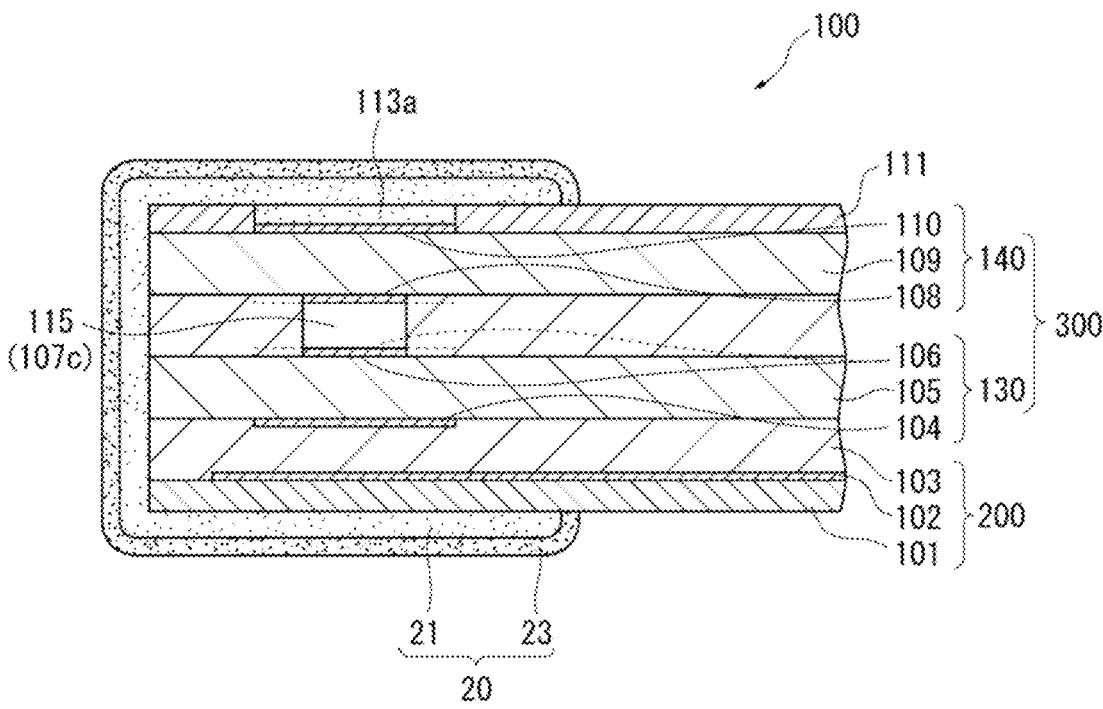
FIG. 3 is a partial enlarged sectional view of the front end side of the detection element in FIG. 1.

FIG. 1 is a sectional view along the longitudinal direction (axial-line-L-direction) of a gas sensor (oxygen sensor) 1 according to the embodiment of the present invention. FIG. 2 is a schematic exploded perspective view of a detection element portion 300 and a heater portion 200. FIG. 3 is a sectional view along the axial-line-L-direction of the detection element portion 300.

As shown in FIG. 1, the gas sensor 1 includes: a sensor element 100 composed of the detection element portion 300 and the heater portion 200 stacked on the detection element portion 300; a metal shell (corresponding to a "housing" of the invention) 30 holding the sensor element 100 and the like therein; a protector 24 mounted to a front end portion of the metal shell 30; and the like. The sensor element 100 is disposed so as to extend in the axial-line-L-direction.

As shown in FIG. 2, the heater portion 200 has a first base body 101 and a second base body 103 each mainly composed of alumina, and a heating element 102 sandwiched by the first base body 101 and the second base body 103 and mainly composed of platinum. The heating element 102 includes: a heat generation portion 102a positioned on the front end side; and a pair of heater lead portions 102b extending from the heat generation portion 102a along the longitudinal direction of the first base body 101. Ends of the heater lead portions 102b are electrically connected to heater-side pads 120 via conductors formed in heater-side through-holes 101a provided in the first base body 101. A body obtained by stacking the first base body 101 and the second base body 103 on each other corresponds to an insulation ceramic body.

The detection element portion 300 includes an oxygen concentration detection cell 130 and an oxygen pump cell 140. The oxygen concentration detection cell 130 is composed of: a first solid electrolyte 105; and a first electrode 104 and a second electrode 106 which are formed on opposing surfaces of the first solid electrolyte 105. The first electrode 104 is composed of: a first electrode portion 104a; and a first lead portion 104b extending from the first electrode portion 104a along the longitudinal direction of the first solid electrolyte 105. The second electrode 106 is composed of: a second electrode portion 106a; and a second lead portion 106b extending from the second electrode portion 106a along the longitudinal direction of the first solid electrolyte 105.

The oxygen concentration detection cell 130 and the oxygen pump cell 140 each correspond to a "cell" of the invention. The second electrode 106 and a third electrode 108 described below each corresponds to "one electrode" of the invention.

An end of the first lead portion 104b is electrically connected to a detection-element-side pad 121 via a conductor formed in each of a first through-hole 105a provided in the first solid electrolyte 105, a second through-hole 107a provided in an insulation layer 107 described below, a fourth through-hole 109a provided in a second solid electrolyte 109, and a sixth through-hole 111a provided in a protection layer 111. Meanwhile, an end of the second lead portion 106b is electrically connected to a detection-element-side pad 121 via a conductor formed in each of a third through-hole 107b provided in the insulation layer 107 described below, a fifth through-hole 109b provided in the second solid electrolyte 109, and a seventh through-hole 111b provided in the protection layer 111.

Meanwhile, the oxygen pump cell 140 is composed of: the second solid electrolyte 109; and the third electrode 108 and a fourth electrode 110 which are formed on opposing surfaces of the second solid electrolyte 109. The third electrode 108 is composed of: a third electrode portion 108a; and a third lead portion 108b extending from the third electrode portion 108a along the longitudinal direction of the second solid electrolyte 109. The fourth electrode 110 is composed of: a fourth electrode portion 110a; and a fourth lead portion 110b extending from the fourth electrode portion 110a along the longitudinal direction of the second solid electrolyte 109.

An end of the third lead portion 108b is electrically connected to a detection-element-side pad 121 via a conductor formed in each of the fifth through-hole 109b provided in the second solid electrolyte 109 and the seventh through-hole 111b provided in the protection layer 111. Meanwhile, an end of the fourth lead portion 110b is electrically connected to a detection-element-side pad 121 via a conductor formed in an eighth through-hole 111c provided in the protection layer 111 described below. The second lead portion 106b and the third lead portion 108b have the same electric potential.

The first solid electrolyte 105 and the second solid electrolyte 109 are each formed from a partially stabilized zirconia sintered body obtained by adding yttria ($Y_2O_3$) or calcia (CaO) as a stabilizer to zirconia ($ZrO_2$).

The heating element 102, the first electrode 104, the second electrode 106, the third electrode 108, the fourth electrode 110, the heater-side pads 120, and the detection-element-side pads 121 can be formed from elements of the platinum group. Examples of suitable elements of the platinum group for forming these include Pt, Rh, Pd, and the like. These elements of the platinum group may be used alone, or in a combination of two types or more.

However, more preferably, the heating element 102, the first electrode 104, the second electrode 106, the third electrode 108, the fourth electrode 110, the heater-side pads 120, and the detection-element-side pads 121 are mainly formed from Pt in consideration of heat resistance and oxidation resistance. Further, preferably, the heating element 102, the first electrode 104, the second electrode 106, the third electrode 108, the fourth electrode 110, the heater-side pads 120, and the detection-element-side pads 121 contain a ceramic component other than the element of the platinum group serving as the main component. From the viewpoint of fixation, this ceramic component is preferably a component that is similar to the material (e.g., a component serving as the main component of the first solid electrolyte 105 and the second solid electrolyte 109) serving as the main component on the side on which these members are stacked.

The insulation layer 107 is formed between the oxygen pump cell 140 and the oxygen concentration detection cell 130. The insulation layer 107 is composed of an insulating portion 114 and a diffusion resistance portion 115. In the insulating portion 114 of the insulation layer 107, a hollow measurement chamber 107c is formed at a position corresponding to the second electrode portion 106a and the third electrode portion 108a. The measurement chamber 107c is in communication with the outside in the width direction of the insulation layer 107. In each of the communicating portions, the diffusion resistance portion 115, which realizes gas diffusion between the outside and the measurement chamber 107c under a predetermined rate controlling condition, is disposed.

The insulating portion 114 is not limited in particular as long as the insulating portion 114 is a ceramic sintered body having an insulating property, and an oxide-based ceramic such as alumina or mullite can be used, for example.

The diffusion resistance portion 115 is a porous body formed from alumina. The rate controlling at the time of a detection gas flowing into the measurement chamber 107c is performed by the diffusion resistance portion 115.

At a surface of the second solid electrolyte 109, the protection layer 111 is formed so as to sandwich the fourth electrode 110 between the protection layer 111 and the second solid electrolyte 109. The protection layer 111 is composed of: a porous electrode protection portion 113a for preventing the fourth electrode portion 110a from being poisoned, so as to sandwich the fourth electrode portion 110a; and a reinforcing portion 112 for protecting the second solid electrolyte 109 so as to sandwich the fourth lead portion 110b.

The sensor element 100 of the present embodiment corresponds to an oxygen sensor element in which: the direction and magnitude of the current flowing between the electrodes of the oxygen pump cell 140 are adjusted such that the voltage (electromotive force) generated between the electrodes of the oxygen concentration detection cell 130 has a predetermined value (e.g., 450 mV); and the oxygen concentration in the gas to be measured corresponding to the current flowing in the oxygen pump cell 140 is linearly detected.

With reference back to FIG. 1, the metal shell 30 is made of SUS430, and includes: an external thread portion 31 for attaching the gas sensor to an exhaust pipe; and a hexagonal portion 32 at which an attachment tool is engaged at the time of the attachment. In addition, the metal shell 30 is provided with a metal-shell-side step portion 33 protruding toward the radially inner side. The metal-shell-side step portion 33 supports a metal holder 34 for holding the sensor element 100. On the inner side of the metal holder 34, a ceramic holder 35 and a talc 36 are disposed in order from the front end side. The talc 36 is composed of a first talc 37 disposed in the metal holder 34 and a second talc 38 disposed at the rear end of the metal holder 34. The first talc 37 is charged and compressed in the metal holder 34, whereby the sensor element 100 is fixed with respect to the metal holder 34. In addition, the second talc 38 is charged and compressed in the metal shell 30, whereby sealability between the outer surface of the sensor element 100 and the inner surface of the metal shell 30 is ensured. A sleeve 39 made of alumina is disposed on the rear end side of the second talc 38. The sleeve 39 is formed in a multi-stepped cylindrical shape, and an axial hole 39a is provided so as to extend along the axial line. The sensor element 100 is inserted in the axial hole 39a. A crimping portion 30a on the rear end side of the metal shell 30 is bent inwardly, and the sleeve 39 is pressed toward the front end side of the metal shell 30 via a stainless ring member 40.

The protector 24 made of metal which covers a front end portion of the sensor element 100 protruding from the front end of the metal shell 30, and which has a plurality of gas-taking-in holes 24a is attached by welding to the outer periphery on the front end side of the metal shell 30. The protector 24 has a double structure. On the outer side in the protector 24, an outer protector 41 in a bottomed cylindrical shape having a uniform outer diameter is disposed. On the inner side in the protector 24, an inner protector 42 in a bottomed cylindrical shape formed such that the outer diameter of a rear end portion 42a is larger than the outer diameter of a front end portion 42b is disposed.

Meanwhile, the rear end side of the metal shell 30 is inserted in the front end side of an outer casing 25 made of SUS430. In the outer casing 25, a front end portion 25a having an enlarged diameter on the front end side is fixed to the metal shell 30 by laser welding or the like. A separator 50 is disposed in the inside on the rear end side of the outer casing 25. A holding member 51 is interposed in a gap between the separator 50 and the outer casing 25. The holding member 51 is engaged with a protruding portion 50a of the separator 50 described below, and is fixed between the separator 50 and the outer casing 25 by crimping the outer casing 25.

The separator 50 is provided with a through-hole 50b for inserting lead wires 11 to 15 for the detection element portion 300 and the heater portion 200, from the front end side to the rear end side, such that the through-hole 50b penetrates the separator 50 (lead wires 14, 15 are not shown). Connection terminals 16 which connect the lead wires 11 to 15 to the detection-element-side pads 121 of the detection element portion 300 and the heater-side pads 120 of the heater portion 200 are accommodated in the through-hole 50b. Each lead wire 11 to 15 is connected to a connector (not shown) outside the gas sensor. Via the connector, input/output of an electric signal is performed between an external device such as an ECU and each lead wire 11 to 15. Although not shown in detail, each lead wire 11 to 15 has a structure in which a conductive wire is covered by an insulation coat made of resin.

Further, a rubber cap 52 having a substantially columnar shape and for closing an opening 25b on the rear end side of the outer casing 25 is disposed on the rear end side of the separator 50. The rubber cap 52 is fixed to the outer casing 25 by the outer periphery of the outer casing 25 being crimped toward the radially inner side in a state where the rubber cap 52 is mounted in the rear end of the outer casing 25. The rubber cap 52 is also provided with through-holes 52a for respectively inserting the lead wires 11 to 15, from the front end side to the rear end side, such that the through-holes 52a penetrate the rubber cap 52.

Next, a porous protection layer 21, which is a characteristic feature of the present invention, will be described.

FIG. 3 is a partial enlarged sectional view of the front end side of the sensor element 100 in FIG. 1. The porous protection layer 21 is provided directly on the surface (the outer surface on the front end side of the sensor element 100) of the stacked body composed of the detection element portion 300 and the heater portion 200. That is, the porous protection layer 21 is in direct contact with the diffusion resistance portion 115 and at least covers the diffusion resistance portion.

In the present example, the porous protection layer 21 is provided so as to cover the entire periphery of the front-end-side part of the sensor element 100, at the outer surface of the sensor element 100 including the diffusion resistance portion 115.

In addition, an outer-side porous layer 23 is formed so as to cover the outer surface of the porous protection layer 21. These two layers are collectively referred to as a "front end protection layer" 20.

The "front-end-side part of the sensor element 100" means, as shown in FIG. 3, in the axial-line-L-direction, the part from the frontmost end of the sensor element 100 to at least the rear end of the measurement chamber 107c (when there is a second measurement chamber that is in communication with the measurement chamber as in a NOx sensor element, the second measurement chamber is also included).

Figure 4:
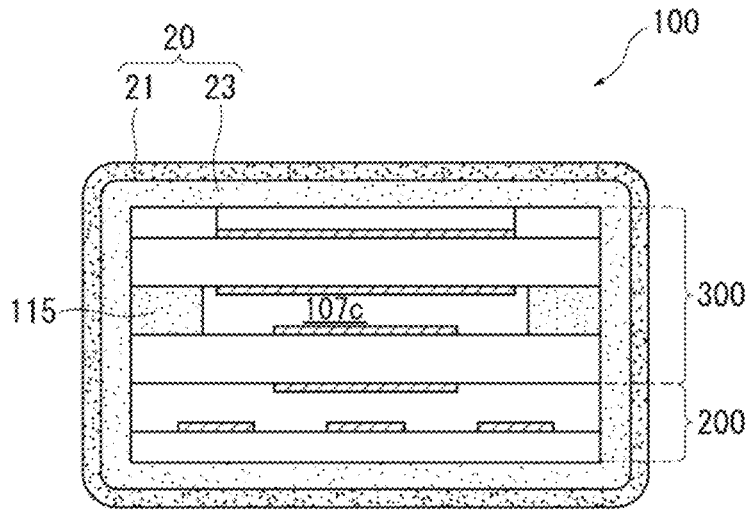
FIG. 4 is a schematic sectional view orthogonal to the axial line direction of a sensor element.

The front end protection layer 20 including the porous protection layer 21 is formed so as to include the front end surface of the sensor element 100 and extend to the rear end side along the axial-line-L-direction, and is formed so as to completely surround the four surfaces of the obverse and reverse surfaces and both side surfaces of the sensor element 100 (stacked body) (see FIG. 4).

The diffusion resistance portion 115, the porous protection layer 21, and the outer-side porous layer 23 each contains ceramic particles which serve as a backbone and pores formed in gaps between the ceramic particles, and the pores form a three-dimensional network structure so as to allow permeation of gas. A plurality of ceramic particles are bound together through sintering or the like, to form a backbone.

In the porous protection layer 21, a diameter ratio R represented by (average diameter D1 (nm) of pores/particle diameter D2 (nm) at which the accumulated number of ceramic particles accounts for 50%) is not greater than 100.

Figure 5:
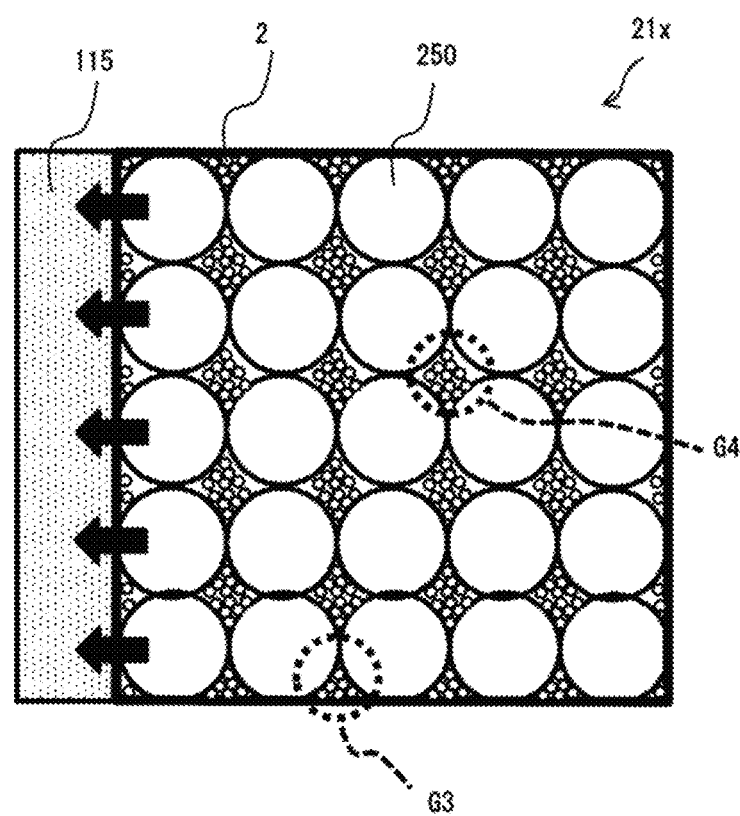
FIG. 5 is a schematic diagram showing an aggregation state of ceramic particles and a pore-forming material during production of a porous protection layer, according to a production method for a sensor according to the embodiment of the present invention.

As shown in FIG. 5, the porous protection layer 21 is produced as follows: a coat liquid 21x in which the ceramic particles 2 and a pore-forming material 250 such as a burn-out-type carbon are mixed is applied to the outer surface near the diffusion resistance portion 115 of the sensor element, and then dried and sintered. The pore-forming material 250 burns out during the sintering to generate pores, whereas the ceramic particles 2 are bound together to serve as a backbone having a network structure of the porous protection layer.

Here, when the coating liquid 21x is applied, water is absorbed by the liquid-permeable diffusion resistance portion 115, and the ceramic particles 2 and the pore-forming material 250 in the coat liquid 21x also tend to aggregate toward the diffusion resistance portion 115.

Therefore, when the diameter ratio R described above is not greater than 100, the average diameter D3 (nm) (corresponding to an average diameter D1 (nm) of the pores after the forming material 250 is removed) of the pore-forming material 250 does not become too large relative to the particle diameter D2 of the ceramic particles 2, and the sizes of a plurality of gaps G3,G4 formed around the adjacent pore-forming material 250 become even. Then, the ceramic particles 2 evenly aggregate (are dispersed) in each gap G3,G4, and the size of space (each gap G3,G4) in which the ceramic particles 2 can be present is restricted, whereby the aggregate of the ceramic particles 2 is less likely to be large.

As a result, the thickness of the backbone formed after sintering of the coat liquid and the distribution of pores in the backbone also become uniform. Accordingly, the flow of the gas to be measured (e.g., exhaust gas) that enters the measurement chamber 107c through the porous protection layer 21 does not vary locally, and thus a decrease in detection accuracy can be suppressed.

Figure 6:
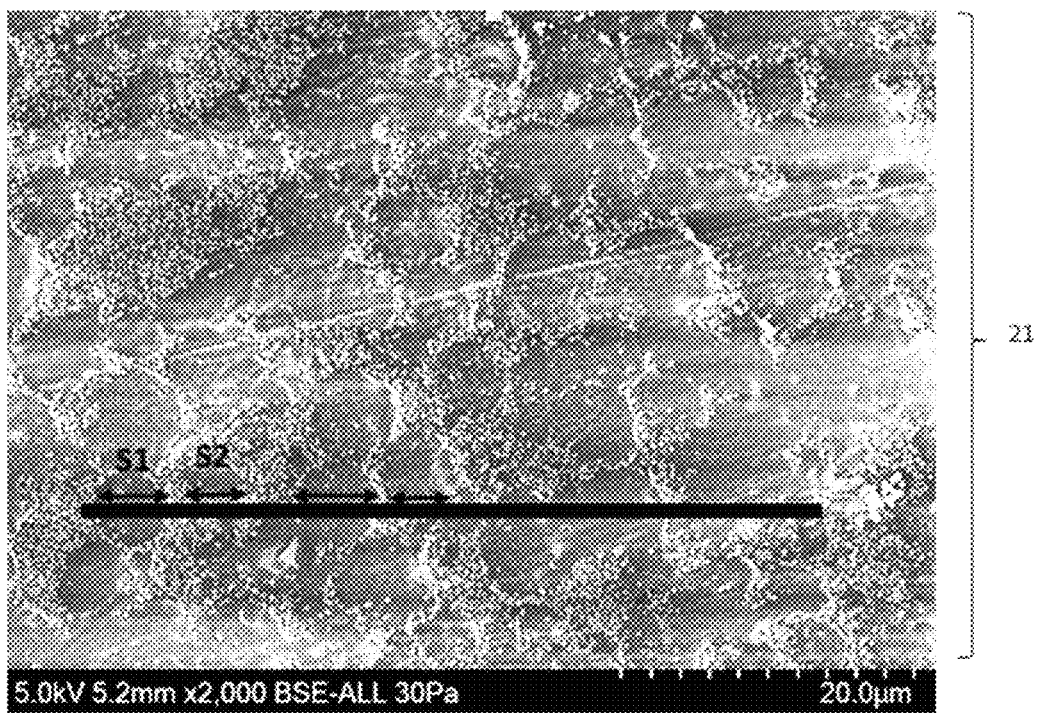
FIG. 6 is a diagram showing a measurement method for D1.

With respect to the measurement of D1, as shown in FIG. 6, in an SEM (scanning electron microscopy) photograph of a cross section of the porous protection layer 21 directly on the diffusion resistance portion 115, a virtual straight line V having a length corresponding to 50 µm is drawn, and a distance S1, S2, . . . of the gap between a particle and a particle that passes through the virtual straight line V is defined as a pore diameter, and the measurement is performed. Then, a value obtained by averaging the distances (pore diameters) S1, S2, . . . of all the gaps that pass through the virtual straight line V is defined as D1. The distances of gaps that are not greater than 500 nm are not considered as pore diameters.

FIG. 6 shows SEM of a cross section of Example Group B.

Similarly, in a SEM (scanning electron microscopy) photograph at a magnification of 40000-fold of the above cross section, 100 ceramic particles are selected at random (on the SEM photograph, ceramic particles are distinguished as white images from pores serving as the background), and the particle diameter (diameter obtained when the area of a particle is converted into that of a circle) of each particle is measured by image analysis software. Then, with respect to the 100 particles, the fine particle side is defined as zero, and the particle diameter at which the accumulated number of particles accounts for 50% is defined as D2.

The average diameter D1 may be not greater than 15 µm, and/or the particle diameter D2 may be not less than 150 nm.

When the average diameter D1 is greater than 15 µm, the porous protection layer 21 may become fragile with respect to external stress.

When the average diameter D1 is not greater than 15 µm, the specific surface area of each piece of the pore-forming material is increased, whereby the pieces of the pore-forming materials are easily bound together. As a result, the obtained pores are more likely to be continuous holes, whereby air permeability becomes preferable.

When the particle diameter D2 is less than 150 nm, the particle diameter is too small, and thus, handling of the particles as powder and preparation of a coating liquid may become difficult.

The lower limit of the diameter ratio R described above is not limited in particular, and when D1=15 µm (15000 nm) and D2=150 nm, the diameter ratio R=100.

A maximum diameter M1 (µm) of pores may be less than twice the average diameter D1 (µm).

When M1< (D1×2) as above, the particle size distribution of the pore-forming material 250 becomes narrower, the sizes of gaps G3, G4 described above become further even, and thus, the distribution of pores also becomes further uniform.

The maximum diameter M1 is the distance of the greatest gap included in the virtual straight line in the measurement of D1 described above.

The porous protection layer 21 can be formed by binding, through sintering or the like, ceramic particles of not less than one type selected from the group consisting of alumina, spinel, zirconia, mullite, zircon, and cordierite, for example. When a slurry (coating liquid) containing these particles is sintered, pores can be formed in the backbone of the coating. However, when the slurry containing the above particles added with a pore-forming material having a removal property (e.g., a burn-out property) is sintered, the portions of the burnt-out pore-forming material become pores, and thus, the porous protection layer 21 having a high porosity can be realized as described below, which is preferable. As the pore-forming material, particles of carbon, resin-made beads, or an organic or inorganic binder can be used, for example.

Preferably, the thickness of the porous protection layer 21 is 20 to 800 µm.

Preferably, the porosity (percentage of void) of the porous protection layer 21 is 40 to 85%. As for the porosity, an SEM (scanning electron microscopy) photograph at a magnification of 1000-fold of a cross section of the porous protection layer 21 is binarized into a dark image of a pore serving as the background and an image brighter than that by image analysis software, whereby the occupation area of pores is measured.

The outer-side porous layer 23 can be formed by binding, through sintering or the like, ceramic particles of not less than one type selected from the group consisting of alumina, spinel, zirconia, mullite, zircon, and cordierite, for example. When a slurry containing these particles is sintered, pores are formed in the backbone of the coating, in the gaps between the ceramic particles or when the organic or inorganic binder in the slurry burns out.

Preferably, the thickness of the outer-side porous layer 23 is 100 to 800 µm.

The diffusion resistance portion 115 can also be formed by binding, through sintering or the like, ceramic particles of not less than one type selected from the group consisting of alumina and zirconia, for example. When a slurry containing these particles is sintered, pores are formed in the backbone of the coating, in the gaps between the ceramic particles or when the organic or inorganic binder in the slurry is burned out. As in a known production method, the diffusion resistance portion 115 is formed by being stacked simultaneously with layers, prior to integrally sintering the sensor element 100 (detection element portion 300).

Preferably, the thickness of the diffusion resistance portion 115 is 10 to 50 µm.

It should be noted that the outer-side porous layer 23 is not necessarily provided, another porous layer may be provided between the porous protection layer 21 and the outer-side porous layer 23, and another porous layer may be provided on the outer side relative to the outer-side porous layer 23.

A production method for producing the sensor element according to the embodiment of the present invention includes: a coating liquid preparation step of preparing the coating liquid 21x in which the ceramic particles 2 and the pore-forming material 250 are mixed; an application step of applying the coating liquid 21x so as to be in direct contact with the diffusion resistance portion 115 of the sensor element 100 described above and so as to at least cover the diffusion resistance portion 115; and a porous protection layer formation step of forming, by drying and sintering the applied coating liquid 21x to burn out the pore-forming material 250, the porous protection layer 21 that contains the ceramic particles 2 which serve as a backbone and has pores formed at burnt-out parts of the pore-forming material 250. In the coating liquid 21x, the diameter ratio R represented by (average diameter D3 (nm)/particle diameter D2 (nm)) is not greater than 100.

Here, "applying a coating liquid (slurry)" means including any one of a dip method, a thermal spraying method, a printing method, and a spraying method that use the coating liquid, and the application method is not limited.

The pore-forming material 250 need not necessarily be burnt out during sintering of the coating liquid 21x, and may, for example, be dissolved (removed) by a solvent before the pore-forming material 250 made of resin is sintered.

As a production method for the porous protection layer 21 and the outer-side porous layer 23, slurries which become the porous protection layer 21 and the outer-side porous layer 23 may be applied in order by a dip method or the like and sintered. In this case, the slurry (coating liquid) which becomes the porous protection layer 21 may be applied and sintered, and then, the slurry which becomes the outer-side porous layer 23 may be applied and sintered. Alternatively, the slurries to be the porous protection layer 21 and the outer-side porous layer 23 may be applied in order and then sintered at one time.

The porous protection layer 21 and the outer-side porous layer 23 may be produced by a thermal spraying method, a printing method, or a spraying method. Further, the porous protection layer 21 and the outer-side porous layer 23 may be respectively formed by different methods selected from a dip method, a thermal spraying method, a printing method, and a spraying method.

The present invention is not limited to the above embodiment, is applicable to any gas sensor (gas sensor element) that has a detection element portion having a solid electrolyte and a pair of electrodes, and is applicable to the oxygen sensor (oxygen sensor element) of the present embodiment. The present invention is not limited to these applications and includes various modifications and equivalents within the technical concept and the scope of the present invention. For example, the present invention may be applied to a NOx sensor (NOx sensor element), an HC sensor (HC sensor element) that detects an HC concentration, or the like.

Example

A below-described coating liquid A to serve as the porous protection layer 21 was adjusted so as to have an appropriate viscosity, and was applied, by a dip (immersion) method so as to have a thickness of 200 μm, to the surface (obverse and reverse surfaces and both side surfaces) on the front end side of the sensor element 100 in a plate shape shown in FIGS. 1, 2. Then, in order to volatize an excess amount of an organic solvent in the coating liquid A, the coating liquid A was dried for several hours in a dryer set at 200° C., and the porous protection layer 21 was sintered under a condition of: in an air atmosphere; 1100° C.; and for three hours.

Coating liquid A: prepared by weighing 40 vol % of an alumina powder (initial D50=150 nm), 60 vol % of a carbon powder (initial D50 was varied between 1.2 and 13.0 μm), and 10 wt % of an alumina sol (external blend), further adding an organic solvent thereto, and stirring the resultant mixture. The D50 diameter was obtained by a laser diffraction scattering method. The D50 diameter of the alumina powder dispersed in the coating liquid A substantially corresponds to D2 measured (the measurement method described above) on the basis of a SEM cross section of the porous protection layer 21 obtained by sintering the coating liquid A. In addition, M1 was obtained on the basis of a SEM of the cross section of the porous protection layer 21.

Next, a below-described slurry B to serve as the outer-side porous layer 23 was adjusted so as to have an appropriate viscosity, and was applied, by a dip (immersion) method so as to have a thickness of not less than 150 μm, to the surface of the porous protection layer 21. Then, in order to volatize an excess amount of an organic solvent in the slurry B, the slurry B was dried for several hours in a dryer set at 200° C., and the outer-side porous layer 23 was sintered under a condition of: in an air atmosphere; 1100° C.; and for three hours.

Slurry B: prepared by weighing 20 vol % of an alumina powder (average particle diameter: 0.1 μm), 80 vol % of a spinel powder (average particle diameter: 40.0 μm), and 10 wt % of an alumina sol (external blend), further adding an organic solvent thereto, and stirring the resultant mixture.

As for the diffusion resistance portion 115, a slurry in which 100 mass % of an alumina powder and a plasticizer were dispersed by wet mixing was prepared. The plasticizer was composed of a butyral resin and DBP. Using this slurry, as in a known production method, the diffusion resistance portion 115 was formed by being stacked simultaneously with layers, prior to integrally sintering the sensor element 100.

The sensor element 100 thus obtained was assembled, to produce the gas sensor 1.

With respect to the obtained gas sensor 1, a test was performed using a model gas inspection device. A model gas of a stoichiometric (λ=1) atmosphere was caused to flow in a pipe, and in a state where the element temperature was controlled so as to be 720° C., a current Ip flowing in the oxygen pump cell 140 and indicating the detection output was measured for a predetermined time t. The average Ip (Ip-AVE) of the current Ip during the time t was calculated, and was compared with a measurement value of each current Ip during the time t, whereby a maximum value ΔIp (%) of deviation from IpAVE was obtained. That is, ΔIp={|IpAVE−each measurement value of Ip|/IpAVE}×100.

Figure 7:
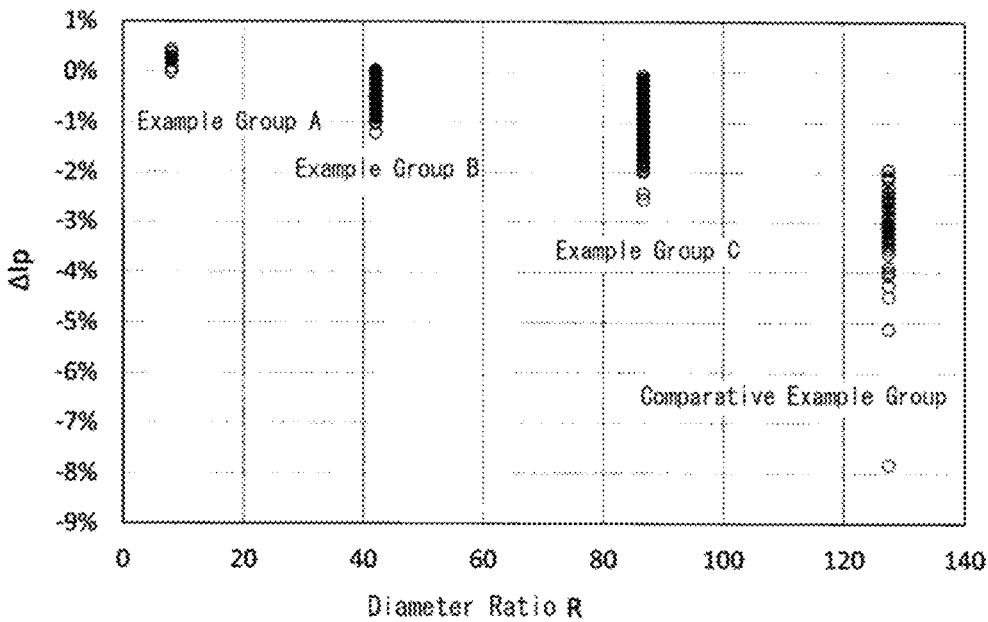
FIG. 7 is a diagram showing a relationship between a diameter ratio R of the porous protection layer and a maximum value $\Delta$Ip (%) of deviation, of pump current, which is variation of sensor output.
Figure 8:
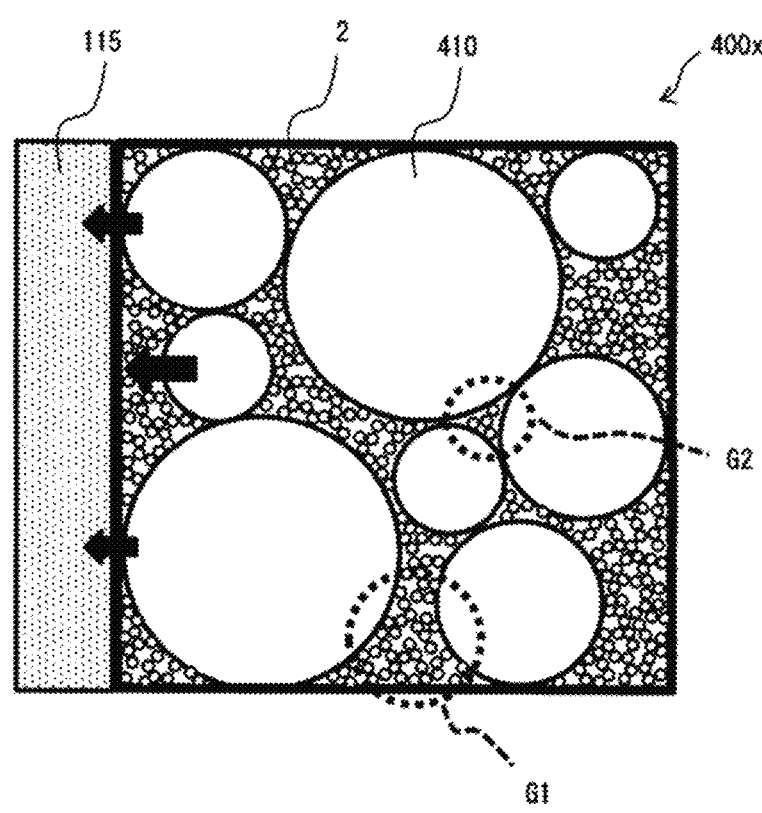
FIG. 8 is a schematic diagram showing an aggregation state of ceramic particles and a pore-forming material during production of a porous protection layer, according to a conventional production method of a sensor.

Table 1 and FIG. 7 show the results.

In "Example Group A", many sensors provided with a porous protection layer were produced under the same condition, and with respect to one sensor out of the above sensors, D1 was measured based on a SEM of a cross section of the protection layer, and this D1 was adopted as D1 of the entire Example Group A. The same applies to Example Groups B, C, and the Comparative Example Group.

With respect to D2, alumina powders having the same value of initial D50 were used in all of Example Groups A to C and the Comparative Example Group. Therefore, for convenience, with respect to one sensor out of Example Group A, D2 was measured based on a SEM cross section of the protection layer, and for convenience, D2s of Example Groups A to C and the Comparative Example Group were considered to be the same.

13

TABLE 1

|  | Example Group A | Example Group B | Example Group C | Comparative Example Group |
|---|---|---|---|---|
| D1(nm) | 1200 | 6300 | 13000 | 19100 |
| D2(nm) | 150 | 150 | 150 | 150 |
| Diameter Ratio R | 8 | 42 | 87 | 127 |
| $\Delta Ip$ | 0.23 | −0.46 | −0.95 | −3.09 |
| $\sigma$ | 0.0016 | 0.0024 | 0.0052 | 0.0091 |

As is apparent from Table 1 and FIG. 7, in the case of Example Groups A to C in which the diameter ratio R was not greater than 100, $\Delta Ip$ was reduced to not greater than 1%, variation in sensor output was reduced, and a decrease in detection accuracy could be suppressed. This is considered to be due to the fact that the flow of the exhaust gas permeating the porous protection layer became uniform.

Meanwhile, in the case of the Comparative Example Group in which D1 was increased and the diameter ratio R was greater than 100, $\Delta Ip$ was greater than 1%, sensor output was varied, and the detection accuracy was decreased.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application Nos. 2022-066816 filed Apr. 14, 2022 and 2022-191136 filed Nov. 30, 2022, the respective disclosures of all of the above of which are incorporated herein by reference in their entirety.

What is claimed is:

1. A sensor element comprising:

a detection element portion provided with at least one cell having a solid electrolyte and a pair of electrodes disposed on the solid electrolyte;

a measurement chamber faced by one electrode of the pair of electrodes; and a diffusion resistance portion through which a gas to be measured is introduced from outside the sensor element into the measurement chamber, wherein the sensor element further comprises a porous protection layer that is in direct contact with the diffusion resistance portion and which at least covers the diffusion resistance portion, the porous protection layer contains ceramic particles which serve as a backbone, and has pores formed in gaps between the ceramic particles, a diameter ratio R, represented by an average diameter D1 (nm) of the pores/a particle diameter D2 (nm) at which an accumulated number of the ceramic particles accounts for 50%, is not greater than 100, and D1 is greater than D2.

2. The sensor element as claimed in claim 1, wherein the average diameter D1 of the pores is not greater than 15 μm, and/or the particle diameter D2 is not less than 150 nm.

3. The sensor element as claimed in claim 1, wherein a maximum diameter M1 (μm) of the pores is less than twice the average diameter D1 (μm) of the pores.

4. The sensor element as claimed in claim 1, wherein the diffusion resistance portion is a porous body.

5. The sensor element as claimed in claim 4, wherein the porous body of the diffusion resistance portion is formed from alumina.

6. The sensor element as claimed in claim 1, wherein a porosity of the porous protection layer is 40 to 85%.

7. A gas sensor comprising:

the sensor element as claimed in claim 1 configured to detect a concentration of a specific gas component in the gas to be measured; and a housing holding the sensor element.

8. A gas sensor comprising:

the sensor element as claimed in claim 2 configured to detect a concentration of a specific gas component in the gas to be measured; and a housing holding the sensor element.

9. A gas sensor comprising:

the sensor element as claimed in claim 3 configured to detect a concentration of a specific gas component in the gas to be measured; and a housing holding the sensor element.

10. A production method for producing a sensor element, the sensor element including a detection element portion provided with at least one cell having a solid electrolyte and a pair of electrodes disposed on the solid electrolyte, a measurement chamber faced by one electrode of the pair of electrodes, and a diffusion resistance portion through which a gas to be measured is introduced from outside the sensor element into the measurement chamber, the production method comprising:

a coating liquid preparation step of preparing a coating liquid in which ceramic particles and a pore-forming material are mixed;

an application step of applying the coating liquid so as to be in direct contact with the diffusion resistance portion and so as to cover the detection element portion, at an outer surface of the sensor element; and a porous protection layer formation step which comprises drying and sintering the applied coating liquid and removing the pore-forming material, to form a porous protection layer that contains the ceramic particles which serve as a backbone and has pores formed at removed parts of the pore-forming material, wherein in the coating liquid, a diameter ratio R, represented by an average diameter D3 (nm) of the pore-forming material/a particle diameter D2 (nm) at which an accumulated number of the ceramic particles accounts for 50%, is not greater than 100, and D3 is greater than D2.

11. The production method as claimed in claim 10, wherein said removing comprises burning out the pore-forming material by the drying and the sintering of the applied coating liquid, and said removed parts are burnt-out parts of the pore-forming material.

12. The production method as claimed in claim 10, wherein said removing comprises dissolving the pore-forming material, and said removed parts are dissolved parts of the pore-forming material.

\* \* \* \* \*